United States Patent [19]

Lin

[11] Patent Number: 5,753,201

[45] Date of Patent: May 19, 1998

[54] METHOD FOR MANUFACTURING SULFURIC ACID

[76] Inventor: Ping Wha Lin, 506 S. Darling St., Angola, Ind. 47603

[21] Appl. No.: 626,266

[22] Filed: Apr. 1, 1996

Related U.S. Application Data

[63] Continuation of Ser. No. 218,748, Mar. 28, 1994, abandoned.

[51] Int. Cl.$^6$ .................................................. C01B 17/74
[52] U.S. Cl. ........................ 423/522; 423/529; 423/532; 423/242.1
[58] Field of Search ........................ 423/210, 224, 423/235, 242.1, 245.3, 576.8, 386, 359, 532, 522, 526, 529; 588/205

[56] References Cited

U.S. PATENT DOCUMENTS

| | | | |
|---|---|---|---|
| 1,125,208 | 1/1915 | Summers | 423/359 |
| 3,043,662 | 7/1962 | Lipscomb | 423/386 |
| 3,349,029 | 10/1967 | Cheng | 210/21 |
| 3,350,170 | 10/1967 | Finneran et al. | 423/359 |
| 3,568,403 | 3/1971 | Richardson | 423/532 |
| 3,592,592 | 7/1971 | Schmidt | 423/532 |
| 3,647,360 | 3/1972 | Jaeger | 423/522 |
| 4,727,237 | 2/1988 | Schantz | 219/121 LC |
| 4,780,305 | 10/1988 | Steppe | 423/574 R |
| 5,061,463 | 10/1991 | Vickery | 423/210 |
| 5,084,258 | 1/1992 | Lin | 423/244 |
| 5,538,707 | 7/1996 | McAlister | 423/522 |

FOREIGN PATENT DOCUMENTS

| | | | |
|---|---|---|---|
| 57-17410 | 1/1982 | Japan | 423/522 |
| 62-235434 | 10/1987 | Japan | 423/210 |
| 2072642 | 10/1981 | United Kingdom | 423/522 |
| 9012636 | 11/1990 | WIPO | 423/210 |

OTHER PUBLICATIONS

"Handbook of Chemistry and Physics" Edited by Hodgman et al., Published by The Chemical Rubber Pub. Co, Cleveland Ohio U.S.A., 43rd Edition, Apr. 1962, pp. 664–665.

"The Manufacture of Sulfuric Acid" edited by Duecker et al., Krieger Publishing Co. Huntington N.Y.; no month 1959; pp. 240–245 and 278–284.

"Chemical Engineer's Handbook" by Perry et al.; pp. 9–15 to 9–19 and also pp. 9–32; 5th ed., McGraw–Hill Book Co. (no month 1973).

U.S. Statutory invention Registration No. H1189 by Kirts published May 1993.

Primary Examiner—Gary P. Straub
Assistant Examiner—Timothy C. Vanoy
Attorney, Agent, or Firm—Barnes & Thornburg

[57] ABSTRACT

A method for manufacturing sulfuric acid from a gas containing sulfur oxides, water and oxygen comprising subjecting the sulfur oxides rich gas to either an adiabatic compressor or a flame impinger to rapidly increase the temperature so that the sulfur dioxide in the gas is converted into sulfur trioxide and cooling the sulfur trioxide rich gas to produce sulfuric acid.

11 Claims, 6 Drawing Sheets

METHOD FOR MANUFACTURING SULFURIC ACID

This application is a continuation of application Ser. No. 08/218,748, filed Mar. 28, 1994, now abandoned.

BACKGROUND OF THE INVENTION

1. Field of the Invention

This invention relates to a method for accelerating chemical reactions by high time rates of temperature change, and more particularly, to a method for employing rapid temperature change in one direction to accelerate the oxidation of polyatomic molecules.

2. Background of the Invention

The conversion of polyatomic molecules to their respective oxidized or reduced species has been achieved via a variety of methods. It is well known, for example, that temperature increases often speed up the reaction rates of many systems. The cracking of crude oil to yield lower weight fractions is a well known process. The use of catalysts, combined to a lesser degree with a temperature increase, to reduce or oxidize certain polyatomic molecules, is also widespread.

The drawbacks to these conversion methods are numerous. The problems associated with crude oil cracking, for example, include high capital costs and lengthy reaction rates with a concomitantly low yield of desired product. Catalyst use is also expensive, mainly due to catalyst regeneration and replacement costs, said catalysts often comprised of rare metals such as platinum, rhodium and palladium.

Another method for the oxidation of polyatomic gas molecules is taught in U.S. Pat. No. 5,084,258, issued to the applicant, wherein hot surfaces such as plates and duct work speed up conversion rates.

However, optimum efficiencies still remain elusive particularly as heated surfaces are not 100 percent conductive.

Furthermore, none of the currently used methods of conversion address those reaction systems whereby a temperature decrease effects an increase in product yield.

A need exists in the art to provide a rapid, efficient, and therefore economical method to convert polyatomic species to desired compounds. Such a method would effect a nearly complete conversion without the expensive use of catalysts, lengthy cracking procedures, or inefficient temperature conduction systems.

SUMMARY OF THE INVENTION

It is an object of the present invention to provide a method for overcoming many of the disadvantages of the approaches or methods of the prior art.

It is another object of the present invention to provide a method for converting polyatomic chemical species. A feature of the invention is the use of a high time rate of temperature change in the process. An advantage of the invention is the nearly complete conversion of polyatomic species to desired compounds.

Still another object of the present invention is to provide a method to accelerate gaseous chemical reaction rates. A feature of the invention is subjecting reactants to abrupt and wide temperature ranges in a short period of time to cause conversions. An advantage of the invention is the elimination of the need for expensive catalysts, cracking processes or inefficient radiating heated surfaces.

Yet another object of the present invention is to provide a method to accelerate the rates of certain gaseous chemical reactions. A feature of the invention is subjecting reactants to abrupt decreases in temperature. An advantage of the invention is facilitating those reactions that require decreases in temperature in order to proceed to desired product.

Briefly, the invention provides a method for accelerating the rate of chemical reactions comprising supplying a stream of gas containing a first type of polyatomic molecule and a second type of polyatomic molecule, subjecting the stream of gas to a high time rate of temperature increase so as to convert the first type of polyatomic molecule, separating the now converted first type of polyatomic molecule from the stream of gas; and subjecting the second type of polyatomic molecule to a high time rate of temperature decrease to convert the second type of polyatomic molecule.

DESCRIPTION OF THE DRAWINGS

These and other objects and advantages of the present invention will become readily apparent upon consideration of the following detailed description and attached drawing wherein.

DETAILED DESCRIPTION OF THE INVENTION

This invention embodies the applicant's theory that high time rates of temperature change will accelerate gaseous chemical reaction rates. Several methods for achieving a rapid time rate of temperature change are disclosed herein.

Generally, Equation 1, below, can be used to explain the applicant's invented method.

$$A + B \rightarrow C \qquad \text{Eq. 1.}$$

where, for purposes of illustration, A equals $SO_2$, B equals $\frac{1}{2}O_2$, and C equals $SO_3$. The concentration of product C can be represented functionally by Equation 2, below.

$$[C] = F\{[A], [B], [M], T, P, t\} \qquad \text{Eq. 2.}$$

where F designates a functional equation.

The time rate of product C production can be calculated by the partial differential equation, designated as Equation 3, which is as follows:

$$\frac{d[C]}{dt} = \frac{\partial[C]}{\partial[A]} \frac{d[A]}{dt} + \frac{\partial[C]}{\partial[B]} \frac{d[B]}{dt} + \frac{\partial[C]}{\partial[M]} \frac{d[M]}{dt} +$$
$$\frac{\partial[C]}{\partial T} \frac{dt}{dt} + \frac{\partial[C]}{\partial P} \frac{dP}{dt} + \frac{\partial[C]}{\partial t} \quad \text{Eq. 3.}$$

where [C] equals product concentration in moles, [A] and [B] equals reactant concentrations in moles, [M] equals background particle concentration in moles, T equals absolute temperature, P equals absolute pressure, and t equals time in seconds.

Generally, the average reaction constant corresponding to a given temperature change rate (dT/dt) can be determined by the following formula:

$$K = K_1[(e)^{B(dT/dt)}]$$

where
$K_1$=reaction constant corresponding to the initial temperature $T_1$ under static condition;
$T_1$=initial temperature before the temperature of the gas system is abruptly changed; and
B=constant determined experimentally.

The pressure of a gas in a closed system is relative to its temperature, as determined by the gas law. A temperature increase of a gas is accompanied by a pressure increase; under adiabatic conditions, the relationship is expressed by the following formula:

$$T_2/T_1 = \{P_2/P_1\}^{0.2857} \quad \text{Eq. 3a.}$$

where $T_2$ and $T_1$ are temperatures of the gas after and before it is heated respectively, and $P_2$ and $P_1$ are pressures of the gas after and before heating it, respectively. A practical illustration of the above discussed temperature-pressure relationships is as follows: If a gas is heated to three times its initial temperature, the pressure will be increased 46.8 times its initial pressure. If the pressure is increased form 14.7 psi to 300 psi, the temperature will be increased from 530° R (70° F.) to 1255° R (795° F.).

Reaction types and temperature effects

Figure 1:
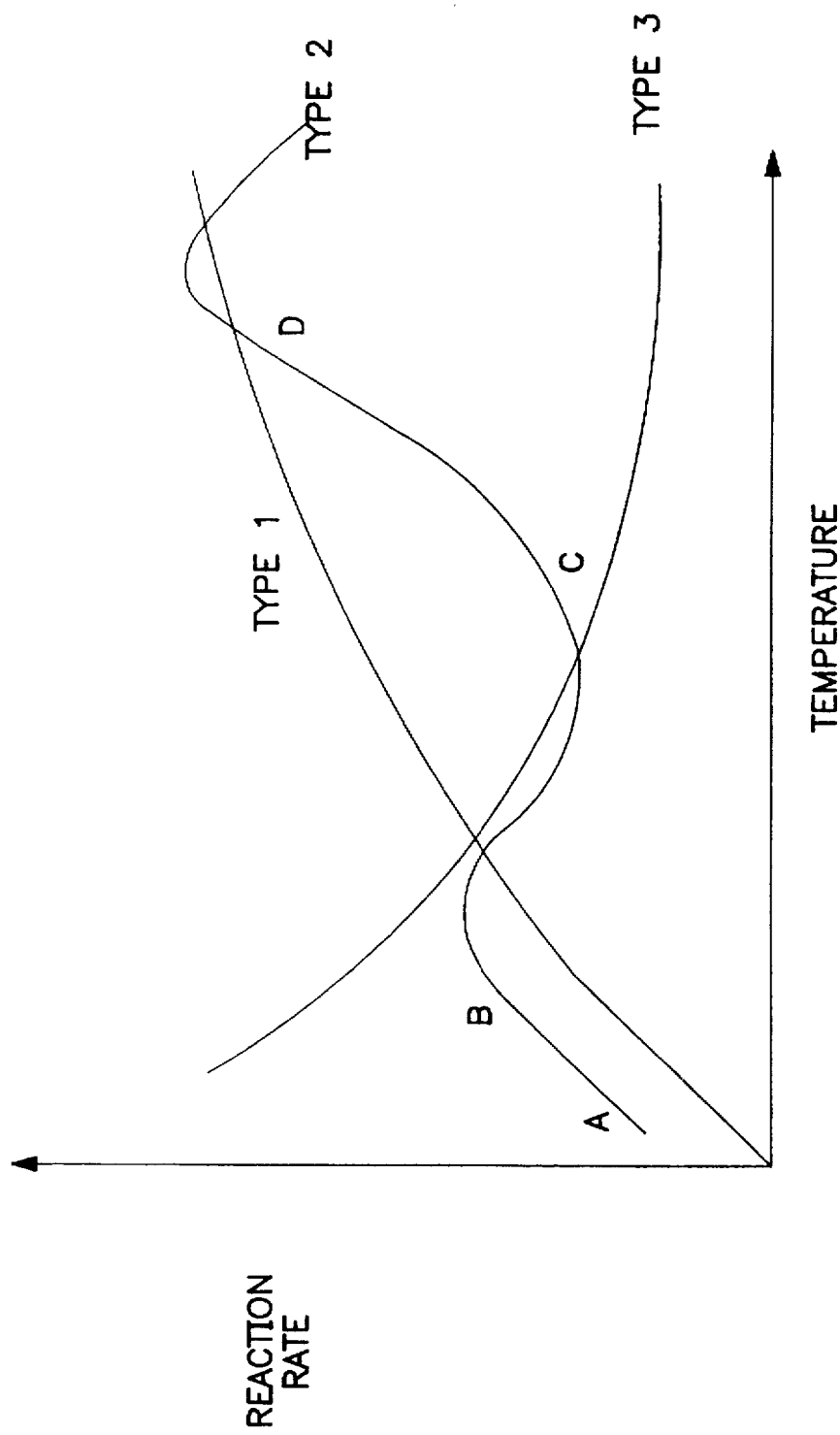
FIG. 1 is a graphical depiction of the three types of reactions facilitated by the invented process.

In a static (adiabatic) condition, chemical reaction rates typically are dependent on temperature. Generally, there are three types of temperature dependant chemical reactions that the invented method will effect. These reaction types are depicted in FIG. 1. The first reaction type, designated as Type 1 in FIG. 1, is a more typical reaction wherein the rate increases with increasing temperature.

The second type, designated as Type 2, is a multiple reaction scenario wherein the reaction rate increases with temperature in certain temperature ranges, but decreases in other temperature ranges. The last type of chemical reaction, designated as Type 3 in FIG. 1, is where the reaction rate decreases with increasing temperature.

Applicant's Theory of High Heat Flux

Energy has many forms and heat is one of them. The forms of energy can be interchangeable. On the atomic and molecular levels, as net heat is added to a gas system, under adiabatic conditions, the net heat is immediately transformed to internal energy and work. In a closed system, work is manifested as a pressure increase. Therefore, the net heat added to a gas system affects its internal energy and pressure. Mathematically, it can be expressed as follows:

$$H = F'(IE, P) \quad \text{Eq. 4}$$

where H equals net heat added to a gas system, F' (IE, P) represents a functional equation, IE equals total internal energy of a gas system which is the sum of the kinetic and potential energies of the components of the system, and P equals pressure of the gas. Therefore, the functional equation 4 can also be expressed as $$H = F'\{KE_m, PE_m, KE_a, PE_a, KE_e, PE_e, P\} \quad \text{Eq. 5}$$

where:
$KE_m$=Total Kinetic energy of gas molecules in a gas system. $= \Sigma \frac{1}{2} m_m v_m^2$;
$PE_m$=Total potential energy of gas molecules in a gas system. For a system such as a reactor of constant volume, it is a constant, k;
$KE_a$=Total kinetic energy of all the atoms or nuclei (for plasma fluid) in a gas system. $= \Sigma \frac{1}{2} m_a v_a^2$;
$PE_a$=Total potential energy for all the atoms or nuclei (for plasma fluid) in a gas system. $= \Sigma m_a r_a$;
$KE_e$=Total kinetic energy of all the electrons in a gas system. $= \Sigma \frac{1}{2} m_e v_e^2$;
$PE_e$=Total potential energy of all the electrons in a gas system. $= \Sigma m_e r_e$;
$m_m$=mass of individual molecule;
$V_m$=velocity vector of individual molecule;
$m_a$=mass of individual atom or mass of individual nuclea in plasma fluid;
$V_a$=velocity vector of individual atom or that of individual nuclea in plasma fluid;
$r_a$=interatomic distance or relative position vector of atoms;
$m_e$=mass of electron;
$v_e$=velocity vector of individual electron; and
$r_e$=distance of individual electron from its nucleus or position vector of the electron with respect to its nucleus in an atom.

Differentiating functional Equation 5 which respect to time, t, results in the following Equation 6:

$$\frac{dH}{dt} = \frac{\partial H}{\partial KE_m} \frac{d(\Sigma 1/2 \, m_m v_m^2)}{dt} + \quad \text{Eq. 6}$$
$$\frac{\partial H}{\partial PE_m} \frac{dK}{dt} + \frac{\partial H}{\partial KE_a} \frac{d(\Sigma 1/2 \, m_a v_a^2)}{dt} +$$
$$\frac{\partial H}{\partial PE_a} \frac{d(\Sigma m_a r_a)}{dt} +$$
$$\frac{\partial H}{\partial KE_e} \frac{d(\Sigma 1/2 \, m_e v_e^2)}{dt} + \frac{\partial H}{\partial PE_e} \frac{d(\Sigma m_e r_e)}{dt} + \frac{\partial H}{\partial P} \frac{dP}{dt} \, .$$

After differentiation, the equation becomes:

$$\frac{dH}{dt} = \frac{\partial H}{\partial KE_m} (\Sigma \, m_m v_m a_m) + \frac{\partial H}{\partial KE_a} (\Sigma \, m_a v_a a_a) + \quad \text{Eq. 7}$$
$$\frac{\partial H}{\partial PE_a} \{\Sigma \, m_a (dr_a/dt)\} +$$
$$\frac{\partial H}{\partial KE_e} (\Sigma \, m_e v_e a_e) + \frac{\partial H}{\partial PE_e} \{\Sigma \, m_e (dr_e/dt)\} + \frac{\partial H}{\partial P} \frac{dP}{dt}$$

Equation 7 shows that the time rate of heat added to the gas system dH/dt is accompanied by the creation of $a_m$, $a_a$, $dr_a/dt$, $a_e$, $dr_e/dt$, and dP/dt where
$a_m$=acceleration vector of an individual molecule in the direction of $v_m$;
$a_a$=acceleration vector of an individual atom relative to another atom in a molecule or that of individual nuclea in a plasma fluid. The direction of $a_a$ correlates with that of $v_a$;

$dr_a/dt$=time rate of change relative position vector of the atoms in a molecule;

$a_e$=acceleration vector of individual orbiting electrons in the direction of $v_e$;

$dr_e/dt$=time rate of change relative position vector between an individual electron and its nucleus; and $dP/dt$=time rate of change of pressure.

The effects of the creation of the aforementioned accelerations, the time rate of change of relative positions of electrons and atoms, and the time rate of change of pressure on chemical reaction rates, takes many forms. On the molecular level, and as can be determined in Equation 7, when net heat is rapidly added to the gas system, the velocities of gas molecules $v_m$ is accelerated by $a_m$ which is in the same direction as the gas molecular velocity before being accelerated; this according to the concept of vectors. The increase of gas molecular velocities will cause an increase in the number of collisions per unit time of the gas molecules, an increase of the momentums of the molecules before impact, and the impact forces during the impact. As a result, $a_m$ is able to enhance chemical reaction rates of gas particles.

At the atomic level, the acceleration of the atom $a_a$, can increase the magnitude of the relative atomic velocity of an atom with respect to others in a molecule, $v_a$, but not affect its direction. It is known that the relative velocity of an atom $v_a$ can be resolved into three components, $(v_a)_x$, $(v_a)_y$, $(v_a)_z$, along x-, y-, and z-directions respectively. If the y-axis coincides with the axis of two atoms of a molecule, the mutually perpendicular x- and z- axes are at right angles with the y-axis. $(v_a)_y$ causes atomic vibration, while $(v_a)_x$ and $(v_a)_z$ cause atoms to rotate against each other. Since aa can increase $v_a$, it can in turn magnify the vibrational and rotational effects of the atoms in a molecule. Therefore, the molecule will expand and contract at higher frequency and spin at faster rotational rates as a result of high time rate of net heat addition to the gas system. Although the atoms in a molecule are subject to restoring force, it will take some time before the velocity of the atoms in the molecules return to their original magnitude. It is well known in the literature that the atoms in a diatomic molecule periodically separate and come together about every $10^{-13}$ sec. Because of sudden heat addition, the vibration of the atoms in the molecule is temporarily modified, and the increasingly agitated molecule is highly active chemically. When the kinetic energy of an atom is raised to above the bonding energy of atoms in a molecule, the molecule splits, analogous to the cracking process in petroleum production.

If the particle is a nuclea in a plasma fluid, it moves freely without bonding. A high time rate of temperature increase of the fluid will cause acceleration $a_a$ of the particle, which in turn continuously changes the magnitude of $v_a$ but not its direction. The collision of the high speed nuclei can induce nuclear fusion.

The rate of change of potential energy of atoms can be represented by $dr_a/t$. This quotient indicates that the equilibrium distance between two atoms is increased by the sudden application of heat to the system, thereby the potential energies of the atoms are also increased. The increase of the inter-atomic distance $r_a$ tends to weaken the bonds between atoms. The atoms with weakened bonds are chemically more active to establish bonds with other atoms.

Furthermore, according to calculus, $dr_a/dt$ is equal to velocity v, by which the kinetic energy of the atoms are changed. If the atomic distance between the two atoms is constant before heat is applied, the atoms will oscillate as a result of high rate of heat increase. If the atoms originally oscillate with respect to each other, the amplitude of the oscillation will be increased after a shock heat is added to the system. On the other hand, if the atoms have original rotational motion with respect to each other, the atoms will spin at faster rates.

For free moving nuclei in plasma fluid, the average potential energy of all nuclei is constant. Therefore, the time rate of potential change is zero.

Equation 7 also shows that the orbital electrons are subject to tangential acceleration when heat is added rapidly to the system. The tangential acceleration causes the velocities of orbital electrons to increase.

In order to simplify the problem, the interaction forces between electrons, being very small, are neglected. Therefore, the electrons are subjected to central forces which point always toward the center of the nucleus, or center of mass of the nuclei. Classical mechanics has determined that the free-flight trajectory of a particle is determined by the eccentricity of the conic section for the trajectory, as depicted in Equation 8, below:

$$e = \frac{r_e v_e^2}{G m_n} - 1 \qquad \text{Eq. 8}$$

where $m_n$=mass of nucleus

G=gravitational constant;

$r_e$=the distance between the electron and the center of the nucleus or mass center of nuclei;

$V_e$=the velocity of the electron.

An increase of $v_e$ by the tangential acceleration, $a_e$, can change e from a negative value to a positive value.

When e=0, the free-flight trajectory is a circle;

e=1, free-flight trajectory is a parabola;

e<1, free-flight trajectory is an ellipse;

e>1, free-flight trajectory is a hyperbola.

From Equation 8, the escape velocity of the electron can be found by setting e=1:

$$v_{esp} = \frac{(2G m_n)^{1/2}}{r_e} \qquad \text{Eq. 9}$$

The velocity of the orbiting electron can be accelerated to an escape velocity, $v_{esp}$, if the time rate of heat increase in the gas system, dH/dt, or $a_e$ is high enough. Because of the removal of electrons from their orbits, the atom or molecule is ionized, and the ionized particles are very active chemically. If most of the elec- trons or all the electrons leave their orbit, the gas fluid becomes plasma which is very active chemically.

The term $dr_e/dt$ represents time rate of change of potential energy of the electron. When there is no heat added to the gas system, the potential energy of an electron is a function of its kinetic energy. As kinetic energy is increased, its potential energy is decreased. However, in a dynamic system where heat is rapidly increased, $dr_e/dt$ is the time rate of change of the position vector from the center of the nucleus to the electron, therefore, it is also equal to the instantaneous velocity which is tangent to the orbit of the electron. This variable velocity helps to move the electron from one orbit to another and boost the energy level of the electron. dH/dt can contribute to an increase in total energy (kinetic and potential) of the electron. When dH/dt is high enough, it causes ionization of the particles (atoms or molecules), or changes the gas fluid to a plasma state.

The last term of equation 7, $(\partial H/\partial P)(dP/dt)$ is a positive value if the time rate of temperature change is a positive value. In a closed gas system, according to equation 3a, ($\partial H/\partial P$) and $dP/dt$ are positive values if time rate of temperature increase $dT/dt$ is a positive value. It is known that for a given gas mass, the higher the gas pressure, the shorter the intermolecular distances, resulting in a higher reactivity.

From the aforementioned explanation, it is now obvious that when a gas system is subject to a high time rate of temperature change, the activity of its molecules, atoms, and electrons are spurred, as if it is suddenly jolted; i.e., velocities of molecules, electrons, atoms or nuclei are increased; frequencies and amplitudes of atomic vibrations in a molecule are increased, average kinetic energy of atoms are increased, electrons leave their orbits, and the gas molecules become very reactive.

In conclusion, when a mixed material is subjected to a heat flux rate, the total heat flux rate is distributed among molecules, atoms or nuclei, and electrons. The average energy in each particle group increases with time, and when the energy of a particle (mole- cule, atom, nuclei or electron) reaches its activation level, reaction takes place. The reaction can be an atom-splitting reaction, a molecular built-up reaction or a nuclear fusion reaction.

Application of Rapid Temperature Change

The time rate of change of net heat or energy of a system is called heat flux rate. The effect of heat flux rate on electrons, atoms or nuclei, and molecules can produce a specific type of reaction. Whether the reaction is an atom-built reaction such as oxidation of sulfur dioxide to sulfur trioxide, a molecular splitting reaction such as oil cracking or destruction of toxic volatile organic compounds (VOC), or a reaction based on nuclei fusion, all reactions are dependent to some degree on heat flux rate. For a specific type of reaction, and for specific reactions, a unique heat flux rate, determined experimentally, is used.

Surprisingly and unexpectedly, the inventor has determined that a rapid conversion of reactants to product (via oxidation, hydrogenation, dehalogenation, bond breakage, etc.) occurs as a result of high rates of heat flux. For Type 2 reactions, best results occur when the temperature of the gas system is changed abruptly from an initial temperature where the slope of the reaction rate/temperature curve is steepest. This initial temperature is predetermined experimentally and under static conditions wherein the temperature of the reaction fluid is solely the manifestation of the exothermic (or endothermic) nature of the specific system. These predetermined temperatures are specific to the reactants.

Obviously, high time rate of temperature changes for liquids and for solids is more difficult to achieve than for gases at present.

The heat flux rate transferred to molecules, atoms, nuclei or electrons can be achieved by conduction, convection, and radiation. The ultimate heat transfer is always by conduction or radiation. As gases are poor conductive materials, proper heat transfers in vapor phases rely on convection and mixing.

There are several means to achieve rapid temperature change, including, but not limited to, the following:

By mechanical means, i.e., the use of a compressor. The temperature of gases compressed rapidly by an adiabatic compressor increases rapidly with pressure. For best results, the compressor should not be cooled during the process. Adiabatic compressors are used for reaction systems having positive $\partial[C]/\partial T$ values. Use of a compressor to produce sulfuric acid by this process is outlined below. For reaction systems having negative $\partial[C]/\partial T$ values, an isothermal compressor such as utilized to compress air or an inert gas (such as liquid nitrogen) to produce a cold fluid stream, said compressed air or inert gas thereby serving as a means to reduce reaction temperatures upon contact with the subject gas stream.

Rapid temperature change, specifically a rapid temperature increase, is effected by rapid combustion in a combustion chamber such as an internal combustion engine which includes spark ignition, compression such as that found in diesel applications, and gas turbines. The fuel used can be in gaseous, liquid or solid form and the oxidizing gases can be air or pure oxygen.

Another method for achieving a rapid temperature increase is by detonating explosives in a closed chamber, in which chemical reactants have been introduced. The explosives release energy through rapid burning.

A fourth method for achieving a rapid temperature increase is by introducing air or oxidants containing the reactants into a combustion nozzle where they are thoroughly mixed with fuel before being released into the combustion chamber for combustion.

Yet another method for achieving a rapid temperature change is by interacting the reactants with hot combustion gases (in the case of rapid temperature increases required in Type 1 reactions, depicted in FIG. 1) or with compressed cold air (as in the case of rapid temperature decreases required in Type 3 reactions, also depicted in FIG. 1). These two methods can be effected by employing a gas flame/flue gas impinger and cold air/flue gas impinger for temperature increase or decrease requirements, respectively, said methods to be illustrated, infra.

A thermal laser beam could also be used to effect a rapid increase in temperature.

An electric arc can also serve as a source of heat energy.

Rapid Temperature Increases

It is a well known phenomenon, pursuant to the gas law, that the pressure of a gas is a function of the temperature of that closed system, so that a temperature increase of a gas is accompanied by a pressure increase. Therefore, for the type of reactions where $\partial[C]/\partial T$ is positive, $\partial[C]/\partial P$ is also positive, leading to the observation that a high time rate of pressure increase will also result in a speedier production of product C.

For most chemical reactions, $\partial[C]/\partial T$ is a positive value, corresponding to the fact that, before equilibrium concentration is reached, a higher temperature of the reaction environment will result in a higher reaction rate. Surprisingly and unexpectedly, the inventor has found that when the temperature of the reaction system is abruptly increased at a point before equilibrium is reached, a supersaturated fluid containing a high concentration of product C is produced. This increase corresponds to the same result depicted mathematically in Equation 3 wherein it is illustrated that an abrupt temperature increase renders $dT/dt$ a positive value; therefore, for Type 1 reactions, the concentration of product, represented by the mathematical product ($\partial[C]/\partial T$) ($dT/dt$), is also a positive value.

The rapid and almost complete conversion of reactants to product occur when the temperature of the gas system is abruptly increased from an initial temperature taken at that point in the reaction sequence where the slope of the reaction rate/temperature is steepest.

If the mixed gases are not cooled down to a lower temperature, the supersaturated concentration of the resulting product will revert to lower concentration. However, if the mixture is cooled rapidly, no energy is left to reformulate the reactants and the supersaturated product fluid becomes saturated. The result is an ultra-high yield of product.

Production of product is further enhanced by its removal from the system via a carrier-gas or reactive gas arrangement. For example, removal of product C is facilitated by reacting it with reactant D (in gaseous, liquid or solid forms) to form E, as represented by Equation 10, below.

$$C + D \rightleftharpoons E \qquad \text{Eq. 10}$$

where, for illustrative purposes, C equals $SO_3$, D equals CaO, and E equals $CaSO_4$. Alternatively, in another illustration, C again equals $SO_3$, D equals $H_2O$, and E equals $H_2SO_4$. E is either in liquid or solid form, or it can be rapidly changed from gaseous phase to liquid phase or to solid phase by modifying reaction conditions, such as temperature. The combination of product C with D and then E serves to pull the initial reaction (depicted in Equation 1) to the right, resulting in a complete conversion of reactants A and B to product C.

Applying the above-disclosed process to flue-gas ($SO_2$) scrubbing systems now renders it feasible to virtually completely remove such polyatomic molecules as $SO_2$ from gaseous effluents.

Rapid Temperature Decreases

Not all chemical reactions will increase in rate when reaction temperatures are increased; i.e., many chemical reactions, i.e. Type 3 reactions, have negative $\partial[C]/\partial T$ values. In these types of reactions, product yield increases dramatically when temperatures are rapidly lowered. This also is illustrated mathematically in Equation 3, whereby abrupt temperature decreases corresponds to a negative value for the quotient $dT/dt$, thereby rendering the mathematical product $(\partial[C]/\partial T)(dT/dt)$ positive, corresponding to an increase in product yield.

FIG. 1 illustrates the relationship of temperature to reaction rate under static conditions for three types of reactions. For Type 1 reactions, an increase in reaction rate is illustrated graphically where the slope of a tangent line to the rate/temperature curve is positive. Of course, the entire slope of the curve depicted for reaction Type 1 in FIG. 1 is positive, as is the slope of the curve between points A and B and between C and D in reaction Type 2. The higher the heat flux, the faster the reaction rate.

For Type 2 reactions, best results of conversion occur when the temperature of the gas is increased abruptly from a temperature value that falls in that area of the curve in which the positive slope of the tangent line is steepest. This steep slope corresponds to the highest value for the term $(\partial[C]/\partial T)(dT/dt)$.

Conversely, a rapid temperature flux could also be employed in those reactions, designated as Type 3 in FIG. 1, where the tangent to the rate/temperature curve is negative. An abrupt decrease of the temperature of the gas system by media, such as cold air or liquid nitrogen, increases reaction rates.

There are many chemical reactions having rate/temperature relationships of the three types discussed supra. Some of these include, but are not limited to, the following:

| | | |
|---|---|---|
| $SO_2 + 1/2 O_2 \rightarrow$ | $SO_3$ | (Type 1) |
| $CO + 1/2 O_2 \rightarrow$ | $CO_2$ | (Type 1) |
| $2H_2S + O_2 \rightarrow$ | $S_2 + 2H_2O$ | (Type 1) |

-continued

| | | |
|---|---|---|
| $2H_2 + O_2 \rightarrow$ | $H_2O$ | (Type 1) |
| $H_2 + O_2 \rightarrow$ | $H_2O_2$ | (Type 1) |
| $N_2 + O_2 \rightarrow$ | NO | (Type 1) |
| $2Cl + 2O_2 \rightarrow$ | $2ClO_2$ | (Type 1) |
| $H_2 + Cl_2 \rightarrow$ | $2HCl$ | (Type 1) |
| $2NO + O_2 \rightarrow$ | $2NO_2$ | (Type 3) |
| $2NO + Cl_2 \rightarrow$ | $2NOCl$ | (Type 3) |
| $VOC^* + O_2 \rightarrow$ | $H_2O + CO_2$ | (Type 1) |
| $2NO + Br_2 \rightarrow$ | $2NOBr$ | (Type 3) |
| $3H_2 + N_2 \rightarrow$ | $2NH_3$ | (Type 1) |
| Destruction of VOCs in effluent control | | (Type 1) |
| Polyethylene Production | | (Type 2) |
| Oil Cracking | | (Type 1) |

Production of Phenol via oxidation of substituted benzene compounds, such as Cumene:

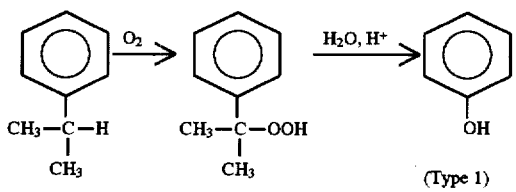

*Hydrocarbon VOCs.

(Type 1)

EXAMPLE 1

Sulfuric Acid Production via Compressor Use

Figure 2:
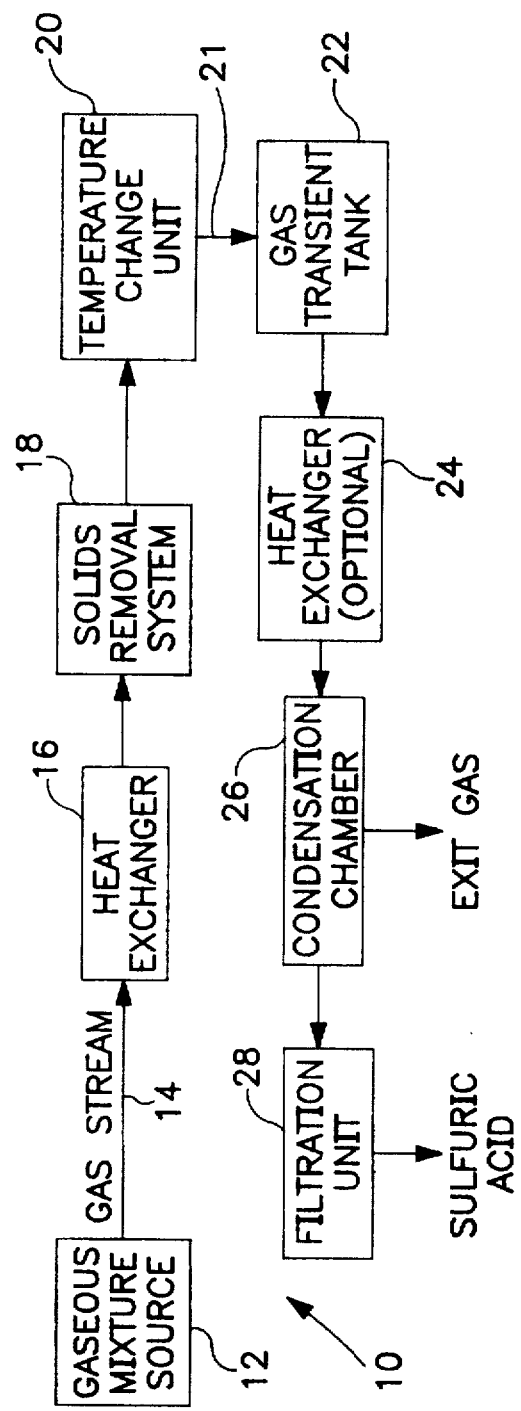
FIG. 2 is a block diagram of a process for increasing rates of reaction by rapidly increasing reaction fluid temperatures, according to the invention.

As discussed supra, heat energy can be converted from mechanical work generated by a compressor. FIG. 2 illustrates the process for increasing reaction rates by a rapid increase in temperature. The process, generally designated by the reference numeral 10, comprises a source of gaseous mixture 12 from which emanates a gas stream 14 containing one or more species of polyatomic molecules, such as $SO_2$, CO, $H_2S$, $H_2S_5$, $H_2$, $NO_x$, $N_2$, $Cl_2$, $Br_2$, nonhydrocarbon-based volatile organic compounds, hydrocarbon-based volatile organic compounds, aryl-and akyl-acid halides, etc., and an oxidizing agent such as $O_2$. This gas source 12 can be, but is not limited to, to, flue gas effluent from coal combustion, utility boilers, industrial boilers, effluent from the oxidation of elemental sulfur in a sulfur furnace, sulfur-dioxide rich gas from metal smelters or ore roasters, or other industrial sources for effluents containing the polyatomic species of the type enumerated herein, or artificially produced gas streams. The gas stream 14 is first passed through a heat exchanger 16, such as an economizer or preheater for heat transfer. Generally, gas stream temperatures ranging from between approximately 300° F. and 600° F. emanating from the heat exchanger are typical.

After passing through the heat exchanger 16, the gas stream 14 is optionally passed through a solids removal system 18. Said solids removal system 18 could be any standard cyclone or bag house.

Upon emerging from either the heat exchanger 16, or the solids removal system 18, the gas stream 14 is passed through a high time rate of temperature change unit 20. In this example, the high time rate of temperature change unit 20 is a compressor. Upon contact with the high time rate of temperature change unit 20, the temperature and the pressure of the gas stream rapidly increases.

This high time rate of increase of temperature and pressure promotes chemical reaction such as the oxidation of $SO_2$ to form $SO_3$, as depicted in equation 11, below:

$$SO_2 + \tfrac{1}{2}O_2 \rightleftharpoons SO_3 \qquad \text{Eq. 11}$$

$SO_3$ concentration in the now-treated gas stream 21 at the outlet of the compressor 20, immediately after being compressed, is supersaturated, corresponding to the gas temperature.

At this point in the process, and to avoid a shifting back to the left of product to reactants, the supersaturated gas stream 21 is passed through a second heat exchanger 24 to lower the gas temperature, to approximately 400° F. in the case of $SO_3$ production. Between the compressor and the second heat exchanger 24, a low volume gas transient tank can be employed so as to maintain the outlet pressure of the compressor. Detention time of the now treated gas stream 21 in the transient tank should be short, preferably in the range between approximately 1 to 3 seconds.

One of the desired products of this conversion process is the formulation of the corresponding acid of the oxidized product. This requires water which is often present in the system due to high moisture content of water in flue gas. In case the moisture content of the gas mixture is low, steam injection facilitates formation of the acid. The steam injection can be at a point before the compressor or after the compressor.

Collecting the acid occurs as follows: upon leaving the second heat exchanger 24, the now treated gas stream 21 is cooled further by expanding it in a condensation chamber 26. The second heat exchanger 24 can be optionally omitted if the gases are cooled down directly in the condensation chamber 26. The condensation chamber 26 can be any standard reflux condenser. The temperature transfer characteristics of the condensation chamber 26, i.e., the length of the temperature conduction passage, and the type of coolant fluid will vary, depending on the condensation temperature of the hydrated species (i.e. acid) of the desired product.

Generally, the condensation chamber 26 should cool the gas stream to slightly below the condensation temperature of the acid. In the case of the product $SO_3$, the condensation of the product to $H_2SO_4$ will destroy the equilibrium of the reaction, depicted in Equation 11, that would exist if the reaction is allowed to proceed under static conditions. The net result is the formation of more $SO_3$ as that product is pulled out of the gaseous phase as its hydrated counterpart. High concentrations (more than 90 percent) of $H_2SO_4$ are produced this way.

The hot liquid phase acid that is collected from the condenser 26 may contain solid particles which are filtered out by a filtration unit 28, which could be comprised of pressurized sand beds, gravity-activated sand beds, centrifugal force, or other electro-mechanical means. Since the temperature of the sulfuric acid after contact with the condensation chamber 26 is still high (certainly above the boiling point of water), the corresponding viscosity of the acid is low. Therefore, the efficiency of the filtration should not be a problem. The sand bed is cleaned by backwashing with water. Alternatively, if the solids removal system 18 is highly efficient, the filtration step can be omitted.

The above-disclosed method for producing sulfuric acid is superior to conventional acid-producing methods. For example, unlike conventional sulfuric acid production processes, the invented process does not involve high efficiency solid removal process, high moisture removal systems, catalytic oxidation systems, and absorption towers. On the contrary, the invented system is economical and has low operational and capital costs.

Adiabatic Compressor Detail

A myriad of adiabatic compressors are available to induce a rapid heat flux rate so as to increase reaction system temperatures.

Under normal compressor operating conditions, a compressor is cooled by a coolant. However, the invented process requires that the compressor not be cooled.

The power required by an adiabatic compressor can be calculated by the formula depicted in Equation 12:

$$P_B = \frac{0.0643 T_a K q_0}{520 (K-1)^n} [(p_b/p_a)^{1-1/K} - 1] \qquad \text{Eq. 12}$$

where PB equals the power of the compressor (in horsepower), $T_a$ equals the inlet absolute temperature, K equals $c_p/c_v$; for diatomic gas, K=1.4, $P_a$ and $P_b$ equals the inlet and outlet pressures, respectively, $q_0$ equals the volume of gas compressed in cubic feet per minute, and n equals the efficiency of the compressor.

On a commercial scale, $SO_2$-rich gas is produced by a sulfur furnace. Upon emerging from the waste heat boiler, the temperature of the gas is approximately 600° F. As determined from Equation 12, the power consumption of the compressor is proportional to the inlet temperature of incoming gas. In order to reduce power consumption of the compressor, the inlet gas temperature is optionally adjusted to as low as possible, preferably above the condensation point of $H_2SO_4$, by using a heat exchanger 16 as depicted in FIG. 2. If the exit gas of a sulfur furnace is adjusted to 300° F. from 600° F. by a heat exchanger before entering the compressor the compressor increases rapidly the gas temperature from 300° F. at the inlet to 600° F. at the outlet, the pressure of the gas increases from 51.9 psia to 166.1 psia, and the power of the compressor is 0.162 h.p. per cubic foot per minute. With a gas detention time in the compressor of 0.06 seconds (based on stroke speeds for a standard 60 Hz AC motor of between 870 and 1160 rpm), the time rate of temperature change is 5000° F. per second, and the pressure change is 1900 psia per second. The inventor has found that this extremely abrupt increase in temperature easily facilitates oxidation of the polyatomic molecule $SO_2$ to $SO_3$.

EXAMPLE 2

Chemical Reaction Rate Increases Using a Gas Flame/Flue Gas Impinger.

Figure 3:
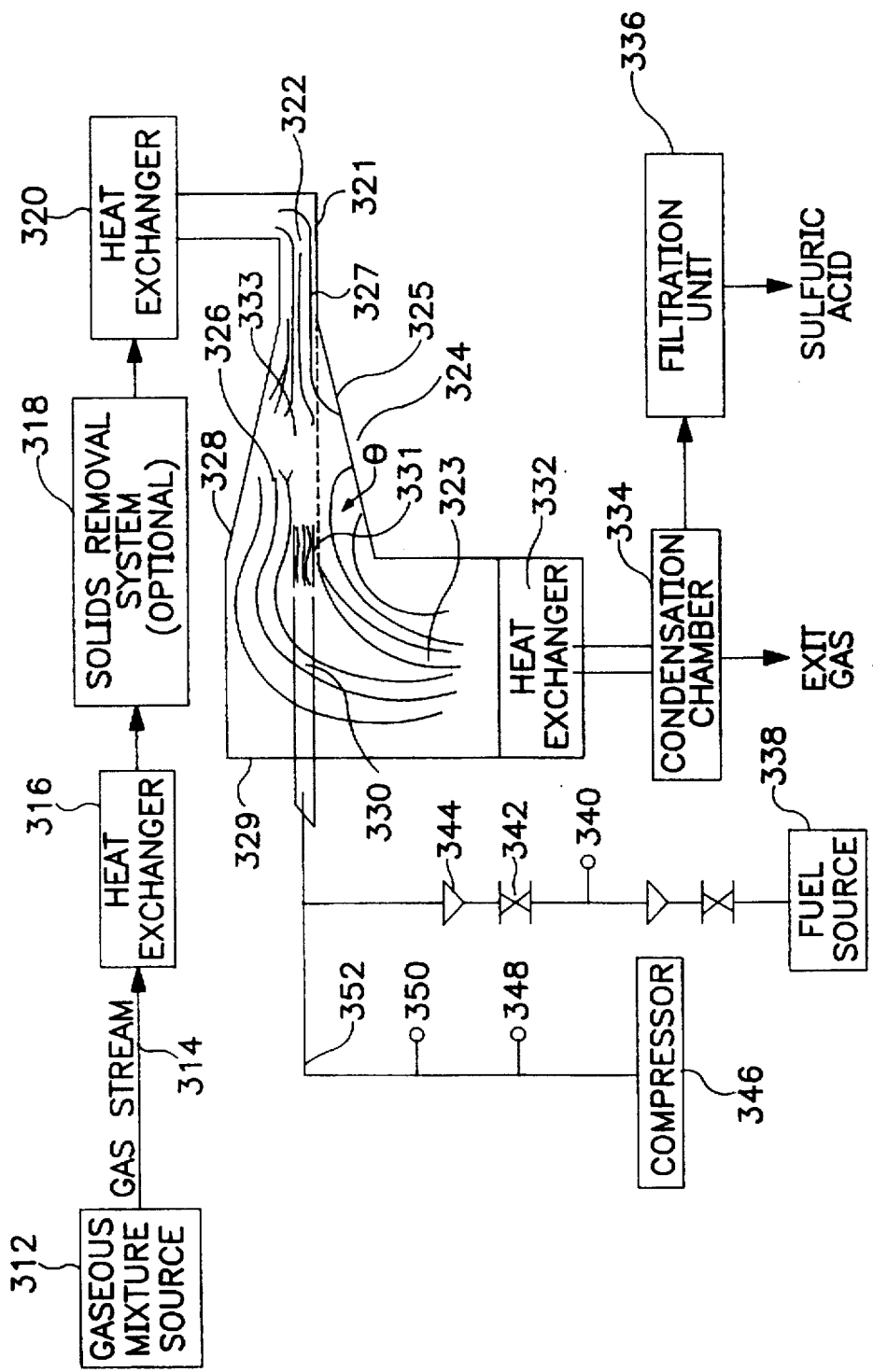
FIG. 3 is another block diagram of another process for increasing rates of reaction by rapidly increasing reaction fluid temperatures, according to the invention.

Gas is a poor heat transfer medium. To increase heat transfer in gas phases, mixing is crucial. FIG. 3 is a schematic diagram depicting how the reaction rate for mutually reactive gases is enhanced in a gas-flame/flue-gas impinger. The production of sulfuric acid from sulfur dioxide and molecular oxygen in flue gas is used as an illustration. As in the first example, the process utilizes a flue gas stream 314 which emanates from a gas source 312. The heat of the flue gas stream 314 is first transferred by a heat exchanger 316 and then a solids removal system 318 (optional) prior to being subjected to high heat flux conditions. The gas stream may then be subjected to a second heat exchanger 320 to adjust the gas stream 314 to a temperature slightly above the condensation point of sulfuric acid. The now temperature-adjusted flue gas stream 322 then flows through a gas flame/flue gas impinger 324, described infra.

The second end 328 of the gas flame/flue gas impinger 324 is configured to direct the flame-contacted flue gas stream 323 to a third heat exchanger 332. This third heat exchanger serves to decrease the temperature of the flame-contacted flue gas stream 323 to slightly above the condensation temperature of the oxidized target polyatomic molecules and the hydrated, oxidized species of the target polyatomic molecules, which in this illustration is $SO_3$ and $H_2SO_4$,respectively.

The flame-contacted flue gas 323 is directed to a condensation chamber 334 where the flame-contacted flue gas 323 is cooled to a temperature below the condensation point of $H_2SO_4$, but above the boiling point of water, by gas expansion and heat transfer. The accompanying phase change of $SO_3$ to $H_2SO_4$ results in an equilibrium shift to the right (see equation 11) wherein more $SO_3$ is produced and subsequently converted to its respective acid.

The newly formed acid is then subjected to a filtering unit 336 for removal of solid particulates if the final uses of the produced acid require such clean-up. As discussed supra, a myriad of filtration devices can be utilized for the filtering unit 336, including but not limited to pressurized sand beds, gravity-activated sand beds, centrifugal force, or other electromechanical means.

Gas flame/flue gas Impinger Detail

The salient features of the gas flame/flue gas impinger 324 are a mixing and reacting zone 326 and a reheat burner 330. The reheat burner 330 directs a flame 331 that flows countercurrent to the flue gas flow.

The mixing and reacting zone consists of an enlarger, or a generally elongated or conical shaped member 325 having a first end 327 adjacent to and downstream from the second heat exchanger 320, and a second end 328 adjacent to the reheat burner 330. This second end 328 is integrally connected to a large pipe section 329 or duct work generally effecting a right angle relative to the incoming gas stream. Generally, the enlarger may have either a circular or square cross-section. The first end 327 is adapted to receive the flue gas stream 322 via a conduit 321, said conduit integrally connected to the downstream end of the heat exchanger 320. The conduit 321 serves to facilitate flow of the flue gas stream 322 to the mixing and reacting zone 326. The wall of the enlarger is tapered along its longitudinal axis at an angle of between approximately 3–30 degrees such that the mixing and reacting zone has a linearly increasing diameter from the first end of the generally elongated chamber to the second end of the generally elongated chamber.

As the flue gas flows through the enlarger, its velocity $v_f$ decreases with the increase of the cross-sectional area, according to the equation of continuity, which is expressed as VA=constant. Since the velocity of the flue gas is reduced as it proceeds in the enlarger, there is a stagnation section 333 where Vf is equal to the velocity of the heater flame $v_h$. This stagnation section 333 is primarily where the mixing of gases begins.

Impinging-Flame Detail

The gas flame 331 in FIG. 3 can be the product of a myriad of sources, including oil combustion flames, electric arc, gas combustion, coal combustion, and other sources, mentioned supra. The flame fuel supply 338 is controlled by a low pressure switch 340, a solenoid valve 342, and a pressure regulator 344. The oxygen for the combustion is supplied by a compressor 346. The flow of the compressed gas is controlled by an air pressure gauge 348 and a low pressure switch 350. Mixing of the oxygen and fuel occurs in the reheat burner 330.

The absolute velocity $v_h$ of the gas flame 331 is related to the gas pressure of the burner. The gas flame flows through the impinger with a velocity ($v_r$) relative to that of the in-flowing flue gas 322, such that $v_r=V_h-v_f$, where $v_h$ equals the absolute velocity of the gas flame front and $v_f$ equals the absolute velocity of flue gas. When $v_h$ is higher than $v_f$, the gas flame 331 will penetrate and impose a rapid heat flux to the flue gas 322. When $v_h$ equals $v_f$, the gas flame 331 behaves as if it hits a wall. The region where $v_h$ equals $v_f$ is the stagnation section 333, discussed supra. At the stagnation section, the velocity head of the hot gas is converted to a pressure head, resulting in a sudden increase of pressure of the hot gas. This pressure increase causes the hot gas to diffuse into the flue gas, whereby violent mixing takes place. This results in heat from the gas flame 331 being rapidly transferred to the flue gas.

To enhance the effect of this pressure head phenomenon, the mixing and reacting zone 326 is designed so that its first end 327 has a smaller annular opening diameter than the diameter of the annual opening of the second end 328 of the mixing and reacting zone 326. This configuration is effected by a 3°–30° deviation from the longitudinal axis of the walls of the cone-shaped mixing and reacting zone 326 from the first end 327 to the second end 328 of the zone. The inventor has found that this deviation, designated as θ in FIG. 3, resulting in an increase in the cross-sectional area of the mixing and reaction zone, effects a velocity drop of the in-flowing pretreated flue gas. This velocity drop results in a longer residence time of the flue gas in the mixing and reaction zone, thereby allowing stagnation of the two gas streams to form in the stagnation region 333.

The resulting well mixed gas 323 will flow around the envelope of the gas flame in the reaction zone. As the flame flows into the reaction zone, some heat is lost by radiation and absorbed by the refractive material of the wall of the duct work. As the well mixed gas flows around the gas flame, $SO_2$, water vapor, and carbon dioxide are able to absorb the radiation from the gas flame and from reflective material comprising the reaction zone walls, thereby further rapidly raising the temperature in the reaction zone.

EXAMPLE 3

Production of Ammonia and Ammonia Salts via High Heat Flux.

While the production of ammonia is a complicated procedure, the disclosed method greatly simplifies the process. In this example, the reactants A and B are nitrogen and hydrogen gas, respectively, whereby nitrogen can be derived from air and hydrogen can be derived from natural gas, oil, coal, lignite, or electrolysis of water.

Figure 4:
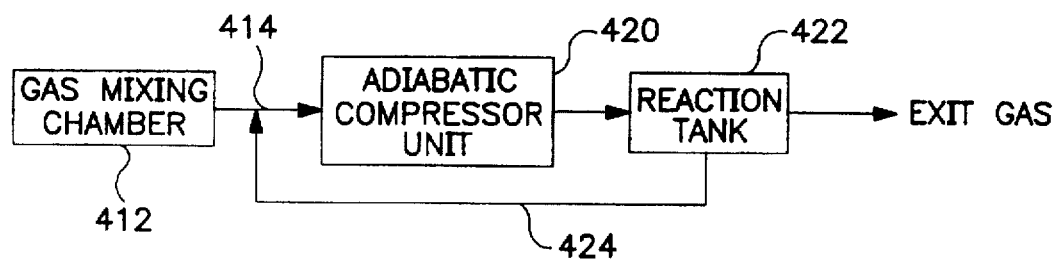
FIG. 4 is another block diagram of a process for increasing rates of reaction, according to the invention.

As depicted in FIG. 4, the ammonia production process includes a means for mixing 412 nitrogen and hydrogen together in a 1:3 mole ratio to create a mixture, and a means for directing 414 the mixture to a compressor 420, of the type similar to that used in Example 1.

Upon entering the compressor 420, the temperature of the gas mixture suddenly and continuously increases, resulting in ammonia production, pursuant to Equation 12, below:

$$N_2+3H_2 \rightarrow 3NH_3 \qquad \text{Eq. 13}$$

The resulting $NH_3$-rich mixture is then introduced into a reaction tank 422 containing a mineral acid corresponding to the ammonia salt desired. For example, if ammonia sulfate $(NH_4)_2SO_4$ is desired, the reaction tank 422 would contain at least equimolar amounts of $H_2SO_4$. If ammonia nitrate is sought, equimolar amounts of $HNO3$ would be contained in the tank 422. The $NH_3$-rich gas reacts with the acid via bubble diffusers (not shown) or any other suitable mixing device. Any unreacted $NH_3$, $N_2$ or $H_2$ exits the reaction tank 422 and is routed back to the compressor 420 using a recycling conduit 424 or other means. Additional gas containing $NH_3$, $N_2$ and $H_2$ is added to the system to repeat the process.

EXAMPLE 4

Production of Nitric Acid and Nitrate Salts.

This example illustrates the utility of the invented method to effect chemical reactions of Type 3, depicted in FIG. 1.

The oxidation of nitric oxide to form nitrogen dioxide is a third order reaction. The reaction mechanism, as elucidated by Trantz in 1916 (Z. Elektrochem 2 2, 104), is depicted below in Equations 14 and 15.

$$NO + O_2 \rightarrow NOO_2 \qquad \text{Eq. 14}$$

$$NOO_2 + NO \rightarrow 2NO_2 \qquad \text{Eq. 15}$$

In static conditions, an increase in temperature tends to dissociate the NOO2, with the result that the rate of reaction may be reduced. Furthermore, as the reaction proceeds, there is a decrease in gas volume. In a closed system when the temperature is maintained at a constant level, there is an increase in pressure.

The applicant has found, however, that a high time rate of temperature decrease will increase the forward reaction rate of Equation 14, resulting in a high reaction rate of Equation 15, and a higher yield of the end product $NO_2$. Conversely, a high time rate of temperature increase will increase the backward reaction rate of Equation 14 and the forward reaction rate of Equation 15, resulting in low concentration of the end product.

In static conditions, the oxidation rate of nitric oxide to nitrogen dioxide increases with a decrease in temperature. Therefore, $\partial[C]/\partial T$ is a negative value. In order to increase the nitrogen dioxide production rate, $d[C]/dt$, the time rate of temperature change $dT/dt$ in the term $\{\partial[C]/\partial T\}\{dT/dt\}$ of Equation 3 must be a negative value. Consistent with the applicant's theory, a high temperature decrease rate accelerates the nitrogen dioxide production rate.

Figure 5:
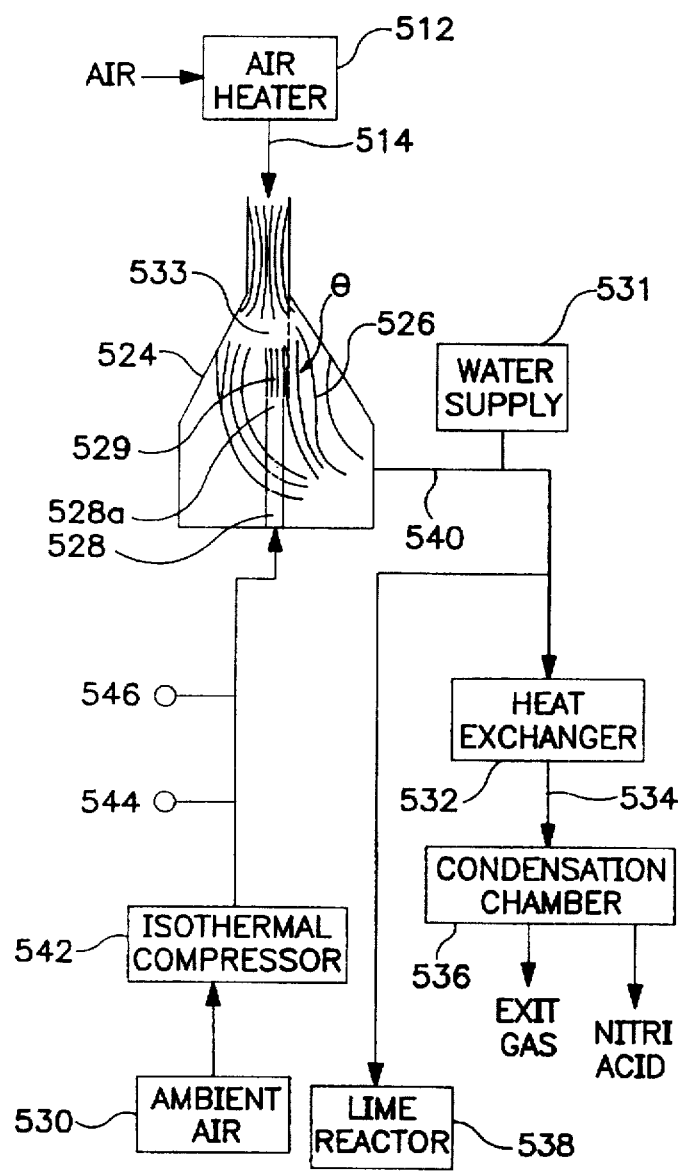
FIG. 5 is a block diagram of a process for increasing rates of reaction by rapidly decreasing reaction temperatures, according to the invention.

FIG. 5 illustrates the process for producing nitric oxide via a rapid increase in the reaction system temperature. In this process, raw material for nitric acid production is air. Air is first introduced into a means for rapidly heating air 512 so as to produced an NO-enriched air stream 514. Such a heating means can include, but is not limited to, a power plant furnace, a compressor, or an internal combustion engine. Upon exiting the heating means 512, the NO-enriched air stream 514 is then directed to a cold-air/ flue-gas impinger 524, having a similar configuration as the gas flame/flue gas impinger 324 depicted in FIG. 3. An obvious difference between the two impingers is that the cold-air/flue-gas impinger 524 supplies cold air or cold fluid (such as liquid nitrogen) to the reaction zone. This stream of cold fluid emanates from an impinger nozzle 528 and into a mixing/reaction zone 526. The cold air 529 is released from the nozzle 528 which is located in the center of the duct work of the impinger 524. The sudden reduction of pressure at the nozzle tip 528a causes a reduction of temperature of the cold air. The cold air 529 is used to sharply decrease the local temperature of the flue gas 514 in the impinger 524. In the impinger, the rapid mixing between cold air 529 and hot flue gas 514 takes place at a stagnation section 533. The rapid local heat transfer at the stagnation section 533 causes a high time rate of temperature decrease of the flue gas, thereby greatly enhancing nitrogen dioxide production. Concomitantly, a portion of the NO is also reverted back to harmless $N_2$ and $O_2$ by the sudden cooling.

Any means for producing cold air or a cold fluid stream can be utilized, including but not limited to, an isothermal compressor, or pressurized liquid nitrogen. In the case of the utilization of cold air, the cold air stream 529 is produced by directing ambient air 530 to an isothermal compressor 542 for pressurization. The pressure of the stream of compressed air 543 is measured by an air pressure gauge 544 and controlled by a low pressure switch 546. The compressed air 543 is released from the nozzle tip 528a and flows counter-currently to the in-flowing flue gas. Rapid temperature decrease of the NO-enriched air stream 514 can also be achieved by directing said stream through an isothermal compressor.

A myriad of isothermal compressors are commercially available to provide the necessary stream of cold compressed air. When using an isothermal compressor for producing cold compressed air, ambient air at a temperature of approximately 70° F., and at a pressure of approximately 14.7 psia (1 atm), is first drawn into the compressor and compressed isothermically.

The cold, compressed air is released into the cold air/flue gas impinger 524 through the impinger nozzle 528 in a direction counter-current to the direction of the flue gas. When the cold air impinges on the NO-enriched air stream 514, the local temperature difference is approximately 360° F. (given an NO-enriched air stream temperature of 400° F. and a cold-compressed air stream temperature of 40° F.). Therefore, an average heat transfer between air and gas molecules is approximately 180° F. With an average heat transfer duration of approximately 0.1 seconds, the time rate of local temperature decrease of the NO-enriched air stream 514 is 1800° F. per sec. This extreme heat flux change facilitates the oxidation of nitric oxide to nitrogen dioxide.

As with the process depicted in FIG. 3, the incoming velocity of the temperature of the cold stream (in this illustration, cold air) is equal the velocity of the incoming NO-enriched stream at the stagnation section 533 so as to create a high stagnation pressure head inside the cold air/flue gas impinger 524, thereby facilitating a complete and rapid mixture of the two streams. This rapid mixing and heat transfer results in the following reaction occurring:

$$NO + \tfrac{1}{2}O_2 \rightarrow NO_2 \qquad \text{Eq. 15}$$

Nitrogen dioxide is a reactive gas so that in the presence of water, nitric acid is formed. Upon exit from the cold air/flue gas impinger 524, the $NO_2$-enriched gas stream 540 is mixed with water vapor to produce nitric acid vapor. Water vapor can be supplied to the system via a water-supply means 531. Often times, no separate water supply is required as flue gas usually contains water vapor.

The resulting $HNO_3$ vapor mixture is then lowered to approximately 240° F., or slightly above the boiling point of diluted nitric acid by subjecting it to a heat exchanger 532. Since the boiling point for very diluted nitric acid is about 224° F., by lowering the flue gas temperature to 240° F., the $HNO_3$ is still in vaporized form. Therefore, there is no danger of acid condensation on the surface of the duct work of the heat exchanger 532 or surfaces of other equipment, thereby minimizing corrosion. A stream of gas 534, rich in nitric acid vapor, exits the heat exchanger 532 and enters a condensation chamber 536 to facilitate separation of the higher boiling fraction nitric acid (b.p. 224° F.) from water (b.p. 212° F.) in the gas stream 534.

Alternatively, instead of subjecting the $NO_2$-enriched gas stream to the heat exchanger 532, the stream is passed through a lime reactor 538 to form calcium nitrate $Ca(NO_3)_2$, calcium nitrite $Ca(NO_2)_2$ and nitrogen. As with the production of nitric acid downstream of the impinger process, removal of $NO_2$ from the $NO_2$-enriched gas (in this instance by lime treatment) causes the reaction to shift to the right, thereby resulting in more nitrogen dioxide production and higher $NO_x$ removal efficiencies. Furthermore, the high time rate of temperature decrease tends to revert NO to $N_2$ and $O_2$. Therefore, another route for the reduction of NO concentration in flue gas is using the invented cold air/flue gas impinger process.

Isothermal Compressor Detail

Ambient air at a temperature of approximately 70° F. and pressure of 14.7 psia is drawn into the compressor and compressed. The resulting pressure is measured by any standard air pressure gauge and controlled by a low air pressure switch. The compressed air is released in the cold air/flue gas impinger through a nozzle in the direction countercurrent to the direction of the flue gas.

The power for 1 std ft³ requirement for isothermal compression is expressed by the following formula:

$$P_B = \frac{0.148 T_a}{520 n} \log\left(\frac{p_b}{p_a}\right)$$

If $P_b$ is 18 psia, the compression ratio pb/pa=18/14.7= 1.224, compressor efficiency n=0.8, then the power requirement is denoted as:

$$P_B = 0.148(460+70)/520 \times 0.8 \log 1.224 = 0.0166 \; hp \; per \; 1 \; std \, ft^3/sec.$$

After releasing from the nozzle, the temperature and pressure of the gas are reduced to $T_c$ and $P_c$ (14.7 psia) respectively, and their relationship can be expressed by the following equation:

$$\frac{T_c}{T_b} = \left(\frac{p_c}{p_b}\right)^{0.2857}$$

$$T_c = (460+70)\left(\frac{14.7}{18}\right)^{0.2857} = 500° \, R = 40.2° \, F.$$

It the flue gas has a temperature of 400° F. and a mass flow rate M, in order to reduce the average temperature of the mixed flow to 3500° F., the mass flow rate of the compressed air M' is calculated as follows:

$$M(460+400) + M'(500) = (M+M')(460+350)$$

$$M'/M = 0.161$$

According to calculation, the volumetric flow rate of the mixed flow at 350° F. is 109 percent of that of the flue gas at 400° F. Therefore, the size of the bag house at the plant exit is not greatly affected by the cold air injection in the impinger.

EXAMPLE 5

Treatment of Gaseous Toxic Chemicals

The application of the invented process is particularly noteworthy in the treatment and disposal of volatile organic compounds. High time rates of temperature increases easily disrupt the atomic bonds of the organic compounds (nonhazardous, hazardous and toxic).

For treating liquid wastes, toxic volatile organic compounds are vaporized first through the use of a heat exchanger and then processed in a manner similar to those processes disclosed in FIGS. 2 and 3.

The vaporization temperatures for a few of the important hazardous air pollutants listed in the 1990 Clean Air Act Amendments are as follows:

| Compounds | Vaporization Temp °C. |
|---|---|
| Pentene | 36 |
| Benzene | 80 |
| Toluene | 111 |
| o-xylene | 144 |
| Ethylbenzene | 136 |
| Naphthalene | 218 |

For treating solid wastes, it is necessary to raise the temperature of the solids above the vaporization temperature for the group of hazardous and toxic chemicals to be removed. Usually, this temperature does not exceed 300° C. At that temperature, most VOCs are volatilized and can be destroyed by high time rate of temperature treatment, as outlined in processes disclosed supra.

Figure 6:
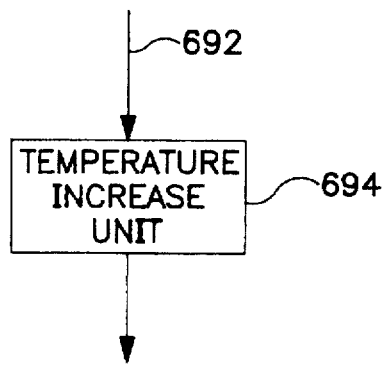
FIG. 6 is a block diagram of a process for detoxifying gaseous materials, according to the invention.

FIG. 6 shows an example of using the invented method for removal of VOCs in gas. The VOCs include hydrocarbon/organic varieties, such as aromatic and aliphatic compounds, and nonhydrocarbon/organic compounds, such as halogenated compounds. Gas containing VOC materials 692 flows through the high time rate temperature increase unit 694 in which the gas temperature is rapidly increased. The unit 694 can be an adiabatic compressor, a hot flame/flue gas impinger as shown in FIG. 3, an internal combustion engine such as a diesel engine, or a gas turbine engine.

Figure 7:
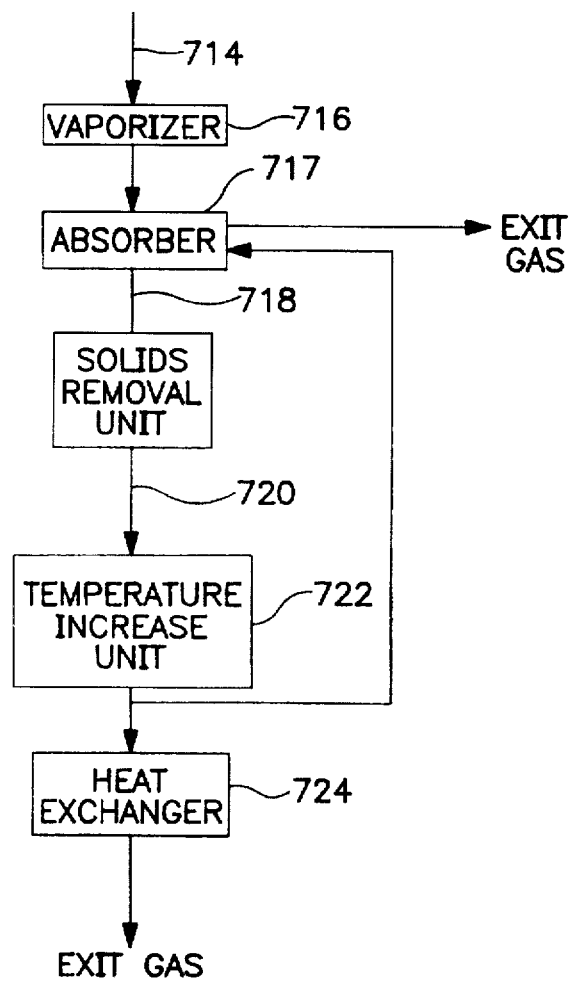
FIG. 7 is a block diagram of a process for detoxifying liquid or solid waste, according to the invention.

FIG. 7 shows the invented method being applied to removal of volatile organic compounds in liquid or solid waste form. Liquid or solid wastes 714 are first fed into a toxic material vaporizer 716 in which the VOCs are vaporized. The VOC materials can be vaporized by direct heating or indirect heating. The wastes in the vaporizer are raised to a temperature above 300° C. at which most volatile chemicals vaporize. As the volume of waste gas containing VOC leaving the vaporizer 716 is not constant, an absorber 717 comprised of zeolite, or other suitable material, may be utilized to maintain vapor concentrations of VOC. The resulting gas 718 containing high concentrations of VOC then can be continuously fed into a bag house or other solids removal means 720. Otherwise (or after a solids removal process is used), the resulting gas 718 is directed into a high time rate temperature increase unit 722 where the organic compounds are destroyed by disruption of atomic bonds. The heat of the exiting gas from the detoxifying unit 722 is optionally extracted by a heat exchanger and then released to the atmosphere. The detoxifying unit 722 can be an adiabatic compressor, an internal combustion engine including a spark ignition engine, diesel engine, gas turbine, or hot flame/flue gas impinger.

The above disclosed processes wherein reactions of Types 1 and 3, depicted in FIG. 1, are facilitated, can be combined. A single flue gas stream containing polyatomic molecules of Type 1 and Type 3 is treated in multiple steps, first converting Type 1 polyatomic species via a high rate of temperature increase, separating those converted species from the remaining flue gas, and then converting Type 3 polyatomic species via a high rate of temperature decrease.

Figure 8:
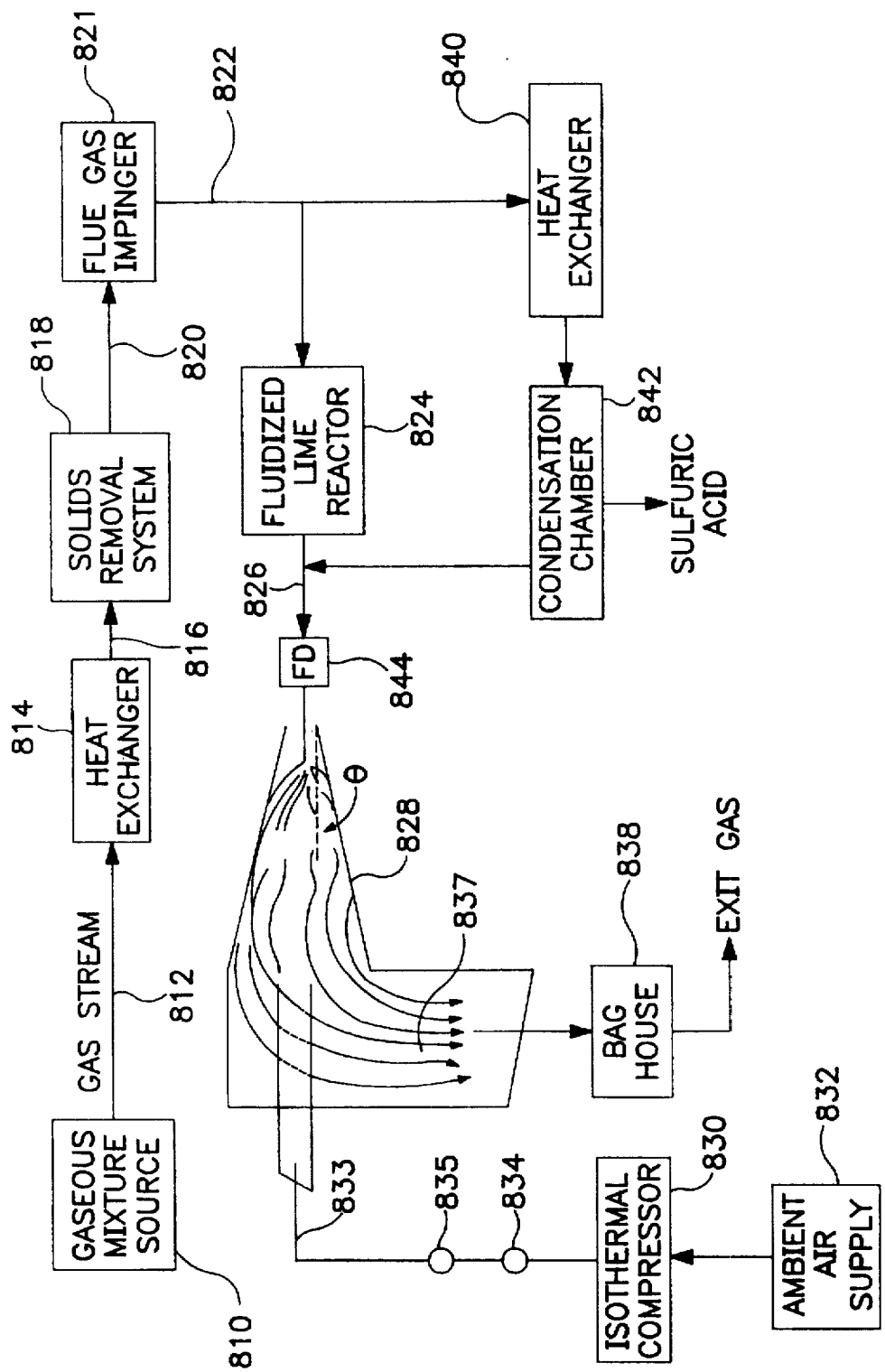
FIG. 8 is a block diagram for a process for accelerating chemical reactions, according to the invention.

Generally, the multiple step process outlined in the preceding paragraph is depicted in FIG. 8. Referring to the figure, the gas containing pollutants 812 releases from its source 810 which can be a furnace for utility boilers, industrial boilers, smelters, roasters, sulfur furnaces, and emission units from petroleum refining and chemical industries. For energy utilization, the gas passes through a heat exchanger or a series of heat exchangers 814. The exchanger can be a super-heater, an economizer, preheater, or a combination of these units. The temperature of the exit gas 816 from the heat exchanger is in the range of approximately 360° F. to 600° F. To reduce the solids load on the solids removal unit at the end of the process, a solids removal unit such as a cyclone 818 is provided at the downstream side of the heat exchanger 814 for removing large solid particles. The gas 820 from the cyclone 818 then passes through a hot flame/flue gas impinger 821 wherein the gas 820 is subject to a high time rate of temperature increase. As a result, $SO_2$ is oxidized to $SO_3$, and volatile organic compounds (VOC) are disintegrated and oxidized to become water, carbon dioxide and other oxidized compounds. The $SO_3$-rich gas 822 is then introduced to a fluidized lime reactor 824 where the $SO_3$ reacts with lime to form $CaSO_4$.

The exit gas 826 from the fluidized lime reactor 824 is free of $SO_x$ and VOC, but it still contains $NO_x$. The gas 826 then passed through a force draft fan 844 and then subjected to a high time rate of temperature decrease in the cold air/flue gas impinger 828. The cold air released from a nozzle 340 is typically produced using an isothermal compressor 830. Ambient air 832 is drawn into the compressor 830 and is compressed isothermically. The compressed air is measured by an air pressure gauge 834 and controlled by a low pressure air switch 835. The compressed air 836 is released in the cold air/flue gas impinger 828 through the nozzle 840 in the direction countercurrent to the direction of the in-flowing flue gas stream. A generally elongated tubular conduit 833 routes the compressed fluid from the compressor 830 to the impinger nozzle 840. The detail of the isothermal compressor function can be found in the subheading of this disclosure entitled "Isothermal Compressor Detail."

When the cold air 836 collides head on with the flue gas 826 in the cold air/flue gas impinger 828, there are two paths of chemical reactions, namely nitric oxide being reverted to elementary nitrogen and oxygen, and oxidation of nitric oxide to form nitrogen dioxide. Therefore, the concentration of $NO_x$ in the mixed gas is reduced and $NO_2$ concentration increased. $NO_2$ is a very reactive gas and can be easily removed by entrained lime particles in the duct work and in the bag house 838. The resulting product of $NO_2$ and lime in the presence of water vapor is $Ca(NO_3)_2$ in the solid form which can be removed by the bag house 838. The exit gas from the bag house is cleaned of $SO_x$, $NO_x$ and VOC.

Alternatively, the $SO_3$-rich gas 822 from the hot flame/flue gas impinger 821 can be used for sulfuric acid production. The temperature of the gas 822 is first adjusted to a temperature slightly above the condensation temperature of $H_2SO_4$ by a heat exchanger 840 and the sulfuric acid therein is condensed out in a condensation chamber 842. The exit gas 826 then flows through the cold air/flue gas impinger 828 for $NO_x$ removal as explained above.

The invented process can also be used to improve duct injection desulfurization processes. The injection of lime or limestone to a furnace or to a point just before a super-heater to effect desulfurization is known. However, the processes have relatively low efficiencies in $SO_x$ removal from flue gas. The efficiency of such a system can be improved by installing a hot flame/flue gas impinger preferably at a point downstream of a super-heater. By means of the impinger, a portion of $SO_2$ is converted to $SO_3$ and the high chemical heat between lime and $SO_3$ in turn induces the conversion of the remaining $SO_2$ to $SO_3$ in the duct work. The $SO_x$ in the flue gas can be easily removed by the passing lime particles.

The process can also be used to induce fusion reactions. High time rate of temperature increases of nuclei in the plasma state has the effect of increasing their kinetic energy. The kinetic energy must be high enough to overcome the repulsive force of nuclei before fusion of nuclei can take place. The increase of kinetic energy by rapid temperature increase of the gas particles results in a required temperature for fusion that is much lower than the theoretical temperature ($10^{9\circ}$ K) for fusion reaction. High time rate of local temperature increases for nuclei can be achieved by a powerful thermal laser beam directed at a fixed point in the plasma fluid. The sudden increase in local temperature of the nuclei induces nuclear fusion reaction at that point. The large amount of energy released from the reaction also causes a rapid temperature increase of the surrounding particles, thus, the reaction propagates outward in three dimensions.

The applicant has developed a unique chemical reaction kinetics theory for employing high time rate of temperature change to accelerate chemical reactions without using catalysts. The use of compressors, internal combustion engines, cold air/flue gas impingers, or hot flame/flue gas impingers, or laser beams to achieve high time rate of temperature changes for increasing chemical reaction rates is new. The use of high time rate of temperature change for enhancing chemical reaction rates is new.

Although the present invention has been illustrated and described in connection with a few examples and embodiments, it will be understood that they are illustrative of the invention and are by no means restrictive thereof. For example, the invention can be advantageously used for all types of reactions depicted in FIG. 1.

It is also understood that when more than two mutually reactive compounds are involved, there are many possible products that can be produced from the process of rapid temperature change. The type of desired product produced depends on the magnitude of the time rate of temperature change, the type of reaction, the reactants involved, the types of bonds between the atoms, and other factors that are specific for the nearly limitless reaction species to which the invented process applies. This invention can also be applied to nuclear fusion reactions. By the use of high time rate of temperature increases, nuclear fusion reactions are enhanced. As a result, cold fusion is possible.

It must be pointed out that the energy added to a closed system, as disclosed supra, to effect a rapid increase of gas temperatures, does not result in wasted energy. Rather, the added energy can be employed for heat generation, exchange or other useful means.

While the invention has been described with reference to details of the illustrated embodiment, these details are not intended to limit the scope of the invention as defined in the appended claims.

The embodiment of the invention in which an exclusive property or privilege is claimed is defined as follows:

1. A process for producing sulfuric acid from a gas stream containing sulfur oxides and oxygen consisting essentially of the following steps:

a.) transmitting a gas stream containing sulfur dioxide, water and oxygen through a means selected from an adiabatic compressor and a flame impinger for removing solids from the gas stream;

b.) subjecting the gas stream to a means for rapidly increasing temperature so that the sulfur dioxide in said gas is converted into sulfur trioxide in one step, thereby forming a sulfur trioxide-rich gas;

c.) passing the sulfur trioxide-rich gas through a heat exchanger to cool the sulfur trioxide-rich gas to a temperature slightly above the condensation temperature of sulfuric acid to thereby produce sulfuric acid vapor;

d.) passing the sulfuric acid vapor through a condensation chamber maintained at above the boiling point of water but below the condensation temperature of sulfuric acid so as to condense out the sulfuric acid; and e.) passing the condensed sulfuric acid through a solids/sulfuric acid separation means to purify and collect the sulfuric acid.

2. The process of producing sulfuric acid as recited in claim 1, wherein the solids removal means is a cyclone separator.

3. The process of producing sulfuric acid as recited in claim 1, wherein the gas stream flows counter-currently with a flame in the flame impinger and the time rate of temperature increase is approximately 5,000° F. per second.

4. The process of producing sulfuric acid as recited in claim 1, wherein the solids/sulfuric acid separation means is a pressurized sand filter, a gravity sand filter, or a centrifugal separation unit.

5. The method as recited in claim 1 wherein the sulfur trioxide-rich gas is combined with steam prior to being passed to the heat exchanger.

6. A process for a producing sulfuric acid from a gas stream containing sulfur dioxide and oxygen as recited in claim 1, wherein the gas stream of step b.) is adjusted to a temperature of between approximately 300° F. and 600° F.

7. The process for producing sulfuric acid as recited in claim 6, wherein the gas stream containing sulfur dioxide is selected from the group consisting of flue gas effluent from a coal combustion, effluent from the oxidation of elemental sulfur in a sulfur furnace, sulfur-dioxide rich gas from metal smelting processes, and a combination thereof.

8. A process for producing sulfuric acid from a gas stream containing sulfur dioxide, oxygen and solid impurities, consisting essentially of:

a.) subjecting a gas stream containing sulfur dioxide, water, oxygen and solid impurities to a means selected from an adiabatic compressor and a flame impinger for rapidly increasing temperature so that the sulfur dioxide in said gas is converted into sulfur trioxide in one step, thereby forming a sulfur trioxide-rich gas;

b.) passing the sulfur trioxide-rich gas through a heat exchanger to cool the gas to a temperature slightly above condensation temperature of sulfuric acid so as to produce sulfuric acid vapor;

c.) passing the cooled sulfur trioxide-rich gas through a condensation chamber maintained above the boiling temperature of water but below the condensation temperature of sulfuric acid so as to condense out sulfuric acid; and passing the sulfuric acid through a sand filter to remove solids and collect the sulfuric acid.

9. The process of producing sulfuric acid as recited in claim 8 wherein the gas stream flows counter-currently with the flame and the time rate of temperature increase of the gas is approximately 5,000° F. per second.

10. A process for producing sulfuric acid from a gas stream containing sulfur dioxide, oxygen and solid impurities consisting essentially of:

a.) subjecting a gas stream containing sulfur dioxide, water, oxygen and solid impurities to a means selected from an adiabatic compressor and a flame impinger for rapidly increasing the temperature of the gas stream, resulting in sulfur dioxide being converted into sulfur trioxide in one step thereby producing a sulfur trioxide-rich gas;

b.) passing the sulfur trioxide-rich gas through a heat exchanger to cool the gas to a temperature above the condensation temperature of sulfuric acid to produce sulfuric acid vapor;

c.) passing the cooled gas stream through a condensation chamber maintained above the boiling point of water but below the condensation temperature of sulfuric acid so as to condense sulfuric acid out of the cooled gas stream; and d.) collecting the sulfuric acid.

11. The improved process to produce sulfuric acid as recited in claim 10 wherein the gas stream containing sulfur dioxide is selected from the group consisting of flue gas effluent from coal combustion, effluent from the oxidation of elemental sulfur in a sulfur furnace, sulfur-dioxide rich gas from metal smelting processes, and a combination thereof.

* * * * *